(12) United States Patent
Han et al.

(10) Patent No.: US 11,361,682 B2
(45) Date of Patent: Jun. 14, 2022

(54) FLEXIBLE DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Wen Han, Hubei (CN); Zhuo Zhang, Hubei (CN); Fang Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 273 days.

(21) Appl. No.: 16/622,019

(22) PCT Filed: Oct. 18, 2019

(86) PCT No.: PCT/CN2019/111836
§ 371 (c)(1),
(2) Date: Dec. 12, 2019

(87) PCT Pub. No.: WO2020/220600
PCT Pub. Date: Nov. 5, 2020

(65) Prior Publication Data
US 2021/0407328 A1   Dec. 30, 2021

(30) Foreign Application Priority Data

Apr. 29, 2019 (CN) .......................... 201910357038.7

(51) Int. Cl.
G09F 9/00 (2006.01)
G09F 9/30 (2006.01)
G06F 1/16 (2006.01)

(52) U.S. Cl.
CPC ............ *G09F 9/301* (2013.01); *G06F 1/1652* (2013.01); *G06F 1/1688* (2013.01)

(58) Field of Classification Search
CPC ....... G09F 9/301; G06F 1/1652; G06F 1/1688
See application file for complete search history.

(56) References Cited

U.S. PATENT DOCUMENTS

| | | | |
|---|---|---|---|
| 10,082,826 B1 * | 9/2018 | Salmon | G06F 1/1652 |
| 11,071,218 B2 * | 7/2021 | Wittenberg | H05K 5/0017 |
| 2008/0049003 A1 * | 2/2008 | Hasegawa | G06F 1/1683 345/206 |
| 2016/0165717 A1 * | 6/2016 | Lee | G06F 1/1652 361/749 |

(Continued)

*Primary Examiner* — Pete T Lee

(57) ABSTRACT

The present invention provides a flexible display device, including a casing, a stretching member, a roller assembly, a stretch resistant layer, a disposing member, and a flexible display screen. The stretching member and the roller assembly are disposed in an accommodating chamber in the casing and do not contact with each other. A first end of the stretch resistant layer is connected to the stretching member, and a second end thereof is wrapped around the roller assembly, extends out of the casing, and is connected to a counterweight assembly. The flexible display screen is disposed on the stretch resistant layer. The present invention mitigates a phenomenon of rupture of the flexible display screen when curling and forced.

19 Claims, 10 Drawing Sheets

(56) References Cited

U.S. PATENT DOCUMENTS

| | | | | |
|---|---|---|---|---|
| 2016/0202729 | A1* | 7/2016 | Lee | G06F 1/1652 |
| | | | | 361/750 |
| 2017/0156219 | A1* | 6/2017 | Heo | H01L 51/0097 |
| 2019/0012008 | A1* | 1/2019 | Yoon | H04M 1/725 |
| 2019/0141843 | A1* | 5/2019 | Park | H05K 1/189 |
| 2020/0100371 | A1* | 3/2020 | Choi | G09F 9/301 |

* cited by examiner a b c

FLEXIBLE DISPLAY DEVICE

FIELD OF INVENTION

The present invention relates a field of display technology, especially to a flexible display device.

BACKGROUND OF INVENTION

A flexible display device has the advantage of good bending resistance, and can be made smaller by folding and curling such that it is more and more popular in the market.

A conventional flexible display device, with structures as shown in FIG. 1, comprising an accommodating chamber 100 and a flexible display screen 110. An opening 111 of the flexible display screen 110 extends upward from the accommodating chamber 100 and implement curling flexible displaying. However, a space of the accommodating chamber 100 limits a radius of a reel and a number of the reel, an over-small radius of the reel causes a great pressure on the flexible display screen 110 and easily results in that the flexible display screen 110 is forced and damaged during often curling.

Therefore, the technical issue of the conventional flexible display device that the flexible display screen is easily damaged when curling needs to be solved.

SUMMARY OF INVENTION

The present invention provides a flexible display device to mitigate that a flexible display screen in a conventional flexible display device is easily damaged when curling.

To solve the above issue, technical solutions provided by the present invention are as follows.

The present invention provides a flexible display device, comprising:

a casing, an accommodating chamber defined in the casing, and an opening defined in a side edge of the accommodating chamber;

a stretching member disposed in the accommodating chamber;

a roller assembly disposed in the accommodating chamber and not contacting with the stretching member, wherein the roller assembly comprises at least one roller;

a stretch resistant layer, a first end of the stretch resistant layer connected to the stretching member, a second end of the stretch resistant layer wrapped around the roller assembly and extending out of the casing through the opening;

a counterweight assembly connected to the second end of the stretch resistant layer; and a flexible display screen disposed on the stretch resistant layer.

In the flexible display device of the present invention, the stretching member is a spiral spring.

In the flexible display device of the present invention, the flexible display device further comprises a driven member, the driven member drives the stretching member to pull the stretch resistant layer out of or retract the stretch resistant layer into the casing.

In the flexible display device of the present invention, material of the stretch resistant layer is stainless steel.

In the flexible display device of the present invention, material of the stretch resistant layer is amorphous material.

In the flexible display device of the present invention, a thickness of the stretch resistant layer is 30 micrometers.

In the flexible display device of the present invention, the stretch resistant layer comprises a first region, a second region, and a middle region between the first region and the second region, the first end of the stretch resistant layer is located in the first region, the second end of the stretch resistant layer is located in the second region, the flexible display screen is located in the middle region, a maximum stretching amount of the stretching member is less than or equal to a length of the first region.

In the flexible display device of the present invention, the length of the first region is greater than or equal to a length of the middle region.

In the flexible display device of the present invention, the length of the first region is greater than a length of the second region.

In the flexible display device of the present invention, a slot is defined in the counterweight assembly, and the second end is fixed in the slot.

In the flexible display device of the present invention, a depth of the slot is less than or equal to a length of the second region.

In the flexible display device of the present invention, the counterweight assembly comprises a speaker.

In the flexible display device of the present invention, the display device further comprises an adhesive layer, the adhesive layer is disposed between the stretch resistant layer and the flexible display screen, and the flexible display screen is fixed on the stretch resistant layer by the adhesive layer.

In the flexible display device of the present invention, material of the adhesive layer is optical clear adhesive.

In the flexible display device of the present invention, the roller assembly comprises a roller, the roller is a gear, the gear is disposed between the stretching member and the opening, tooth structures are formed on a surface of the stretch resistant layer contacting with the gear, and the tooth structures engage with the gear.

In the flexible display device of the present invention, the roller assembly comprises a first roller and a second roller, the first roller and the second roller are disposed on two sides of the stretching member respectively, wherein a distance between the first roller and the opening is less than a distance between the second roller and the opening, an axial line of the first roller parallels an axial line of the second roller, the first end of the stretch resistant layer is connected to the stretching member, the second end of the stretch resistant layer is sequentially wrapped around the second roller and the first roller and extends out of the casing through the opening.

In the flexible display device of the present invention, a diameter of the first roller is greater than or equal to a diameter of the second roller.

In the flexible display device of the present invention, the first roller is a gear, tooth structures are formed on a surface of the stretch resistant layer contacting with the first roller, and the tooth structures engage with the gear.

In the flexible display device of the present invention, the roller assembly further comprises a third roller, the third roller is disposed between the first roller and the stretching member, an axial line of the third roller parallels the axial line of the first roller, the first end of the stretch resistant layer is connected to the stretching member, the second end of the stretch resistant layer is sequentially wrapped around the third roller, the second roller, and the first roller and extends out of the casing from the opening.

In the flexible display device of the present invention, the first roller is a gear, tooth structures are formed on a surface of the stretch resistant layer contacting with the first roller, and the tooth structures engage with the gear.

Advantages of the present invention are as follows. The present invention provides a flexible display device, comprising a casing, stretching member, a roller assembly, a stretch resistant layer, a disposing member, and a flexible display screen, an accommodating chamber defined in the casing, and an opening defined in a side edge of the accommodating chamber; the stretching member disposed in the accommodating chamber; the roller assembly disposed in the accommodating chamber and not contacting with the stretching member, and the roller assembly comprising at least one roller; a first end of the stretch resistant layer connected to the stretching member, and a second end of the stretch resistant layer wrapped around the roller assembly and extending out of the opening the casing; the counterweight assembly connected to the second end of the stretch resistant layer; the flexible display screen disposed on the stretch resistant layer. Because the flexible display screen is disposed on a surface of the stretch resistant layer, when the stretching member pulls back the stretch resistant layer into or extends out the stretch resistant layer from the casing, the flexible display screen is almost not forced, and the pressure acts on the stretch resistant layer. Therefore, a phenomenon of the flexible display screen forced and ruptured is mitigated, and the lifespan of the flexible display screen is prolonged. Furthermore, because the disposing member is disposed, when the stretch resistant layer extends out of the casing, the flexible display screen can be pulled along a direction of gravity, which enhances flatness of the flexible display screen.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
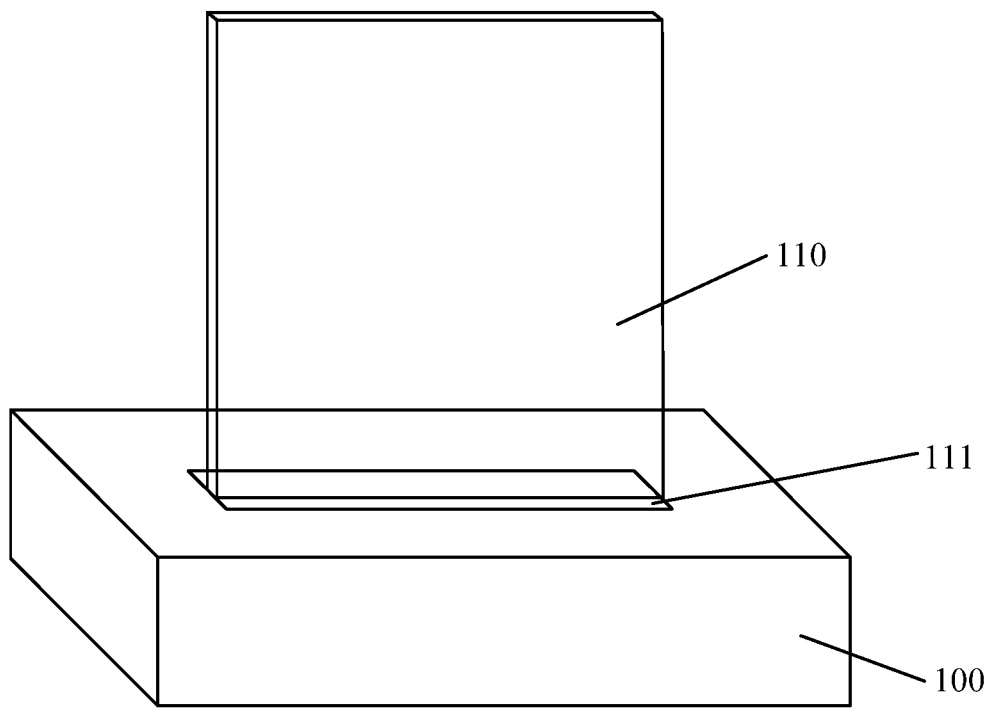
FIG. 1 is a schematic view of a structure of a conventional flexible display device.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

The present invention provides a flexible display device to mitigate a technical issue that a flexible display screen in a conventional flexible display device is easily damaged when curling.

Figure 2:
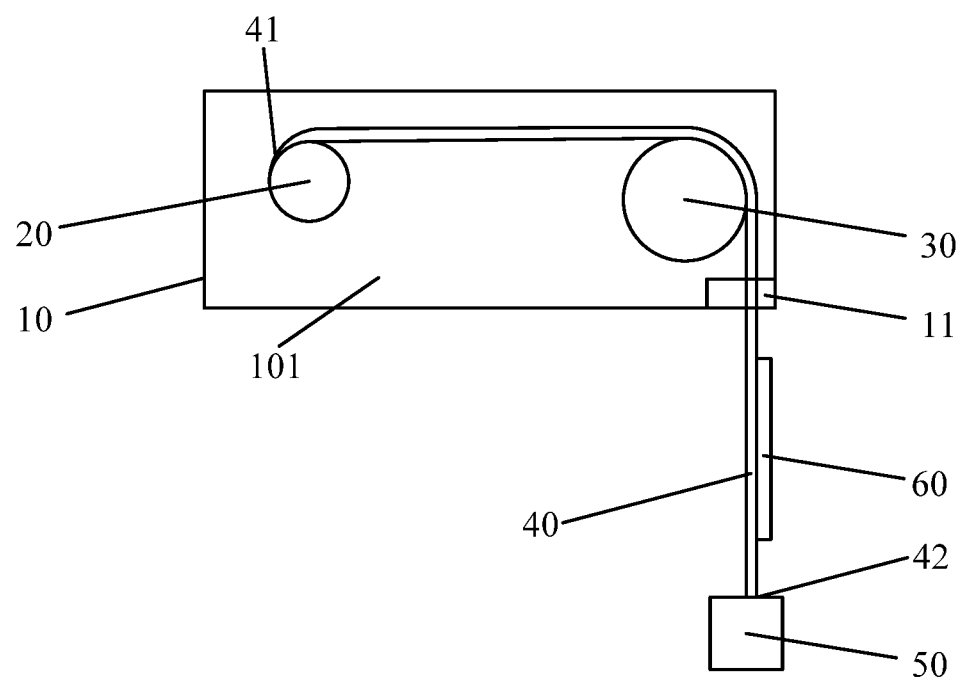
FIG. 2 is a schematic view of a first structure of a flexible display device provided by an embodiment of the present invention embodiment.

With reference to FIG. 2, FIG. 2 is a schematic view of a first structure of a flexible display device provided by an embodiment of the present invention embodiment. The flexible display device comprises a casing 10, a stretching member 20, a roller assembly 30, a stretch resistant layer 40, a counterweight assembly 50, and a flexible display screen 60.

The casing 10 is generally a cubic structure, but is not limited thereto. It can be designed in different shapes based on actual demands. An accommodating chamber 101 is defined in the casing 10, and an opening 11 is defined in a side edge of the accommodating chamber 101.

The stretching member 20 and the roller assembly 30 are both disposed in the accommodating chamber 101, and the roller assembly 30 does not contact with the stretching member 20. The roller assembly 30 comprises at least one roller. In the present embodiment, roller assembly 30 only comprises a roller.

The stretch resistant layer 40 is usually a rectangular structure, a first end 41 of the stretch resistant layer 40 is connected to the stretching member 20, and a second end 42 of the stretch resistant layer is wrapped around the roller assembly 30 and extends out of the casing 10 through the opening 11.

The stretch resistant layer 40 has better folding and curling capabilities, has a very small stretching amount under a certain pulling force, and usually is stainless steel or amorphous material. In an embodiment, a thickness of the stretch resistant layer 40 is 30 micrometers.

The counterweight assembly 50 is connected to the second end 42 of the stretch resistant layer 40, and counterweight assembly 50 is disposed outside the casing 10.

The flexible display screen 60 is disposed on the stretch resistant layer 40, and is disposed on a side surface of the stretch resistant layer 40 away from the roller. Thus, when the stretch resistant layer 40 is wrapped around the roller assembly 30, the flexible display screen 60 has no contact with the roller assembly 30, and the roller assembly 30 would not cause damage of the flexible display screen 60.

The conventional flexible display screen is usually disposed to be an upward pulled structure when needed for use, i.e., an opening of the base is upward. When not used, the flexible display screen retracts downward back into the base. In one aspect, because the opening of the base is upward, dust or other impurities easily fall into the opening and are difficult to clean, which causes contamination of the flexible display screen and affects displaying performance. In another aspect, the base needs to be set in a certain place and therefore occupies a certain space.

The present invention embodiment disposes the opening of the casing 10 downward such that foreign matters such as dust or impurities would not fall in to the opening to cause contamination of the flexible display screen 60. The casing 10 can be installed to a wall of a ceiling of a house or a wall cabinet, and almost occupies no use space. The stretching member 20 is configured to pull the stretch resistant layer 40 back into or extend the stretch resistant layer 40 out of the casing 10. When the flexible display screen 60 is required for use, the stretching member 20 extends the stretch resistant layer 40 out of the casing 10, and then the flexible display screen 60 extends out of the casing 10 accordingly for displaying images. When the flexible display screen 60 is used, the stretching member 20 pulls the stretch resistant layer 40 back into the casing 10, and then the flexible display screen 60 retracts back into the casing 10 accordingly. During the entire pulling-back and extending-out process, because the casing 10 is always installed in the wall or the wall cabinet, an observer can only see a displaying screen of the flexible display screen 60 such that a visual effect thereof is beautiful and would not cause interference to the sight.

Furthermore, in a conventional flexible display device, a flexible display screen curls by being wrapped around a reel in a base. The base needs to occupy an additional external space and therefore would not be designed with an excessive volume. Because a space in the base is limited, a radius of a reel and a number of the reel, an over-small radius of the reel causes a great pressure on the flexible display screen and easily results in that the flexible display screen is forced and damaged during often curling.

Figure 3:
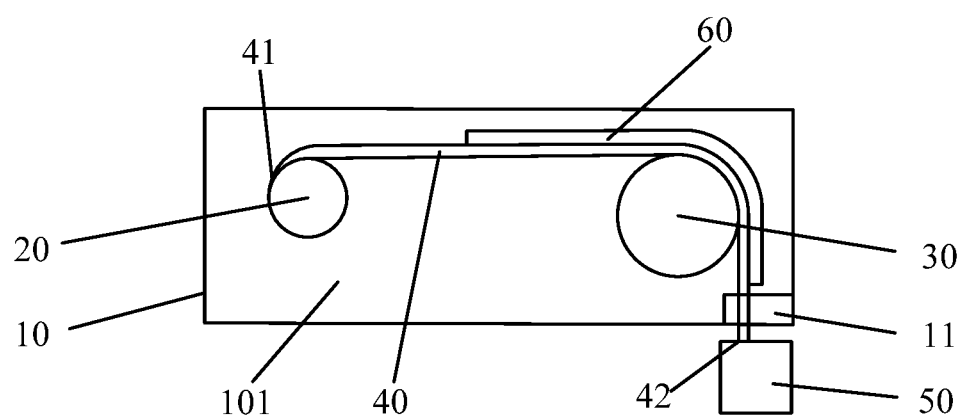
FIG. 3 is a schematic view of the flexible display device provided by the embodiment of the present invention embodiment in a contracting status.

In the present invention embodiment, the first end 41 of the stretch resistant layer 40 is connected o the stretching member 20, is wrapped around the roller assembly 30, and extends out of the casing 10 through the opening 11. With reference FIG. 3, FIG. 3 is a schematic view of the flexible display device provided by the embodiment of the present invention embodiment in a contracting status. When the stretching member 20 pulls the stretch resistant layer 40 back to the casing 10, the flexible display screen 60 accordingly enters the casing 10 and is also wrapped around the roller assembly 30. Because the stretching member 20 does not contact with the roller assembly 30, i.e., a certain distance is therebetween. Therefore, only a part of the stretch resistant layer 40 in the casing 10 is wrapped around the stretching member 20 and the roller assembly 30, and a remaining part thereof is still in a flat extended status. Such wrapping way makes a degree of curling of the stretch resistant layer 40 less, and force exerted on the retracting flexible display screen 60 is also less. Furthermore, because the casing 10 is installed in a non-effective use space in a wall or a cabinet, the volume can be comparatively increased. The accommodating chamber 101 in the casing 10 is more sufficient. Compared to a base of the conventional flexible display device, a dimension of the roller assembly 30 can be designed greater, and a folding degree of the flexible display screen 60 is educed, which further decrease a risk of rupture of the flexible display screen 60.

During the present embodiment extending out the flexible display screen 60 of or pulling back the flexible display screen 60 into the casing 10, Because the flexible display screen 60 fits a surface of the stretch resistant layer 40, a pulling force is exerted on the stretch resistant layer 40, and the flexible display screen 60 almost suffers no force, which effectively protects the flexible display screen 60, prolongs a lifespan of the flexible display screen 60, and prevent rupture of the forced flexible display screen 60.

In an embodiment, as shown in FIG. 3, the flexible display screen 60 completely retracts back into the casing 10, and the counterweight assembly 50 accordingly retracts back nearby the opening 10.

In an embodiment, a portion of the flexible display screen 60 retracts back into the casing 10, another part thereof stays with the counterweight assembly 50 outside the casing 10 and can display information such as time and weather, which improves a use rate of the flexible display screen 60.

The counterweight assembly 50 is disposed outside the casing 10, is connected to the second end 42 of the stretch resistant layer 40. After the stretch resistant layer 40 extends out of the casing 10, because of a self-weight of the counterweight assembly 50, the stretch resistant layer 40 can be pulled along the gravity, which enhances flatness of the flexible display screen 60 and makes a better visual effect to an observer.

The stretching member 20 is configured to pull back the stretch resistant layer 40 into or extend the stretch resistant layer 40 out of the casing 10. A first end of the stretch resistant layer 40 is connected to the stretching member 20. The stretching member 20 can automatically retract or can be retracted under an external force.

In an embodiment, stretching member 20 is a spiral spring, The spiral spring is able to constantly supply a greater restoring force in the narrow accommodating chamber 101 to automatically retract the stretch resistant layer 40 into the casing 10.

In an embodiment, flexible display device further comprises a driven member. The driven member drives the stretching member 20, and pulls out the stretch resistant layer 40 out of or retract the stretch resistant layer 40 back into the casing 10. The driven member can be a structure for providing a driving force, for example, a motor.

In an embodiment, flexible display device further comprises a holding member (not shown in the figures). The holding member can be disposed on a path along which the stretch resistant layer 40 is pulled out of or retracts back into the casing 10, for example, a place around the opening 11. When the stretch resistant layer 40 is pulled out of the casing 10, the flexible display screen 60 is accordingly driven and pulled out. When the flexible display screen 60 is pulled out for a suitable length, the holding member holds the non-pulled part of the flexible display screen 60, such that the flexible display screen 60 can keep the extending length without further falling off. The holding member can be manually switched on and off, and can be switched on and off by the driven member.

The roller 30 is disposed on the stretching member 20 near the opening 11 such that when wrapped around the roller assembly 30 and suffers the pulling force by the counterweight assembly 50, the stretch resistant layer 40 can point to a direction of the gravity along a tangent line of the roller assembly 30 to make the flexible display screen 60 to be perpendicular to a level surface to have a better visual effect. At the meantime, an area of the opening 11 is required to be sufficiently large to allow the stretch resistant layer 40 to be smoothly pulled out of and retract back into the casing 10.

Figure 4:
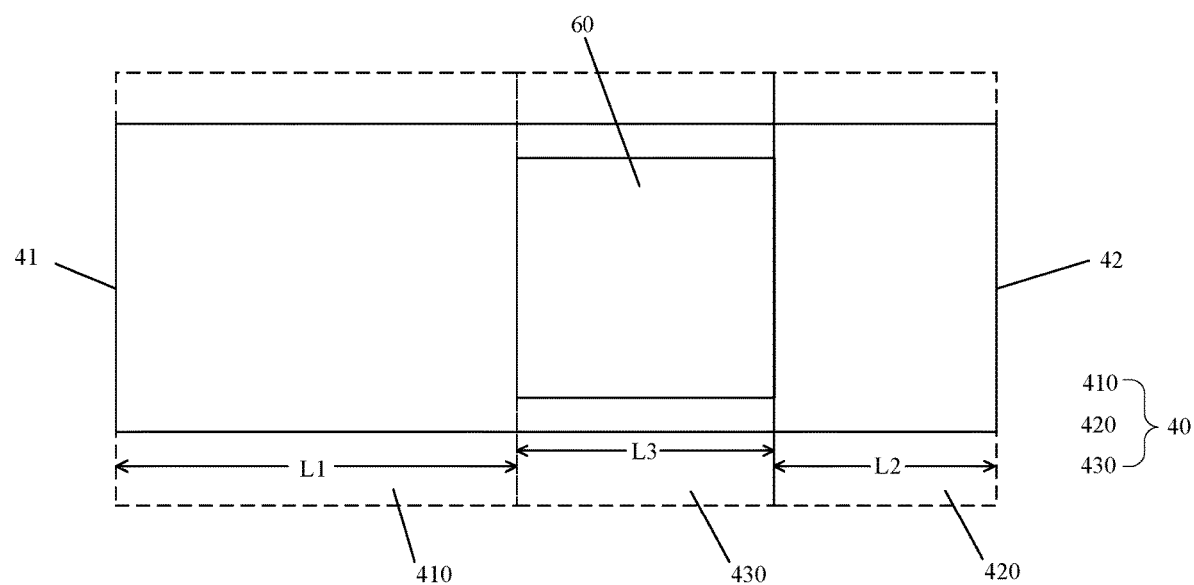
FIG. 4 is a schematic view of a stretched structure of a stretch resistant layer of the flexible display device provided by the embodiment of the present invention embodiment.

With reference to FIG. 4, the flexible display screen 60 is disposed on the stretch resistant layer 40, and the display device further comprises an adhesive layer (not shown in the figures). The adhesive layer is disposed between the stretch resistant layer 40 and the flexible display screen 60. The flexible display screen 60 is fixed on the stretch resistant layer 40 by an adhesive layer. Material of the adhesive layer can be optical clear adhesive that is cured to adhere the flexible display screen 60 and the stretch resistant layer 40, but the present invention is not limited thereto. Other material capable of fixing the flexible display screen 60 on the stretch resistant layer 40 can serve as an adhesive layer.

The stretch resistant layer 40 comprises a first region 410, a second region 420, and a middle region 430 located between the first region 410 and the second region 420. A first end 41 of the stretch resistant layer 40 is located in the first region 410, and the second end 42 of the stretch resistant layer 40 is located in the second region 420. The flexible display screen 60 is located on the stretch resistant layer 40, and is located in the middle region 430.

The flexible display screen 60 is generally a rectangular structure, and an area of the flexible display screen 60 is less than or equal to an area of the middle region 430.

A maximum stretching amount of the stretching member 20 is less than or equal to a length L1 of the first region 410. As such, when the stretch resistant layer 40 retracts back into the casing 10, the flexible display screen 60 inside the middle region 430 would not be reeled into the stretching member 20, which prevents the flexible display screen 60 from damage.

The length L1 of the first region 410 is also greater than a length L3 of the middle region 430 so it is guaranteed that when the stretch resistant layer 40 retracts back into the casing 10, the flexible display screen 60 also completely retracts back into the casing 10 instead of being left outside the casing 10.

Furthermore, because the second end 42 of the stretch resistant layer 40 is connected to the counterweight assembly 50, when the flexible display screen 60 completely retracts back into the casing 10, a distance of the counterweight assembly 50 from the opening 11 is better to be less such that not only an occupied space is reduced but also the stretch resistant layer 40 can retract back into the casing 10 in the most extent for prolonged lifespan. Therefore, a length L3 of the second region is generally designed shorter, and each of the length L1 of the first region 410 and the length L3 of the middle region 430 is greater than a length L2 of the second region 420.

The counterweight assembly 50 is disposed at the second end 42 of the stretch resistant layer 40 to ensure flatness of the flexible display screen 60. The stretch resistant layer 40 is disposed in the counterweight assembly 50, and the flexible display screen 60 would not enter the counterweight assembly 50, in other words, the counterweight assembly 50 would not cause damage to the flexible display screen 60.

Figure 5:
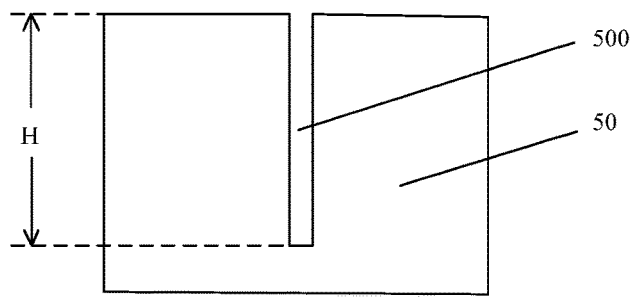
FIG. 5 is a schematic cross-sectional view of a counterweight assembly of the flexible display device provided by the embodiment of the present invention embodiment.
Figure 5:
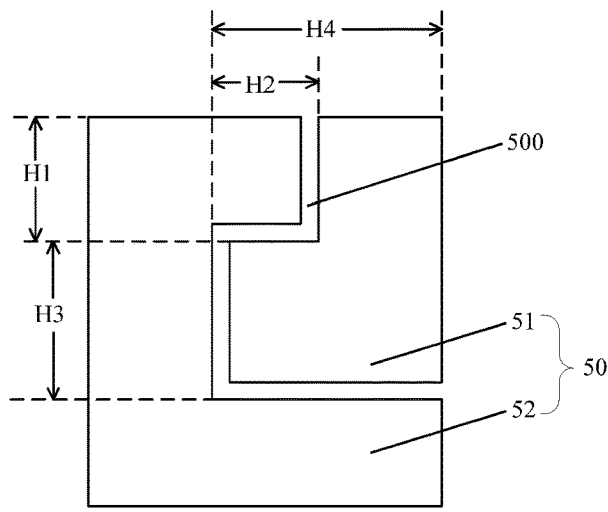
Figure 5:
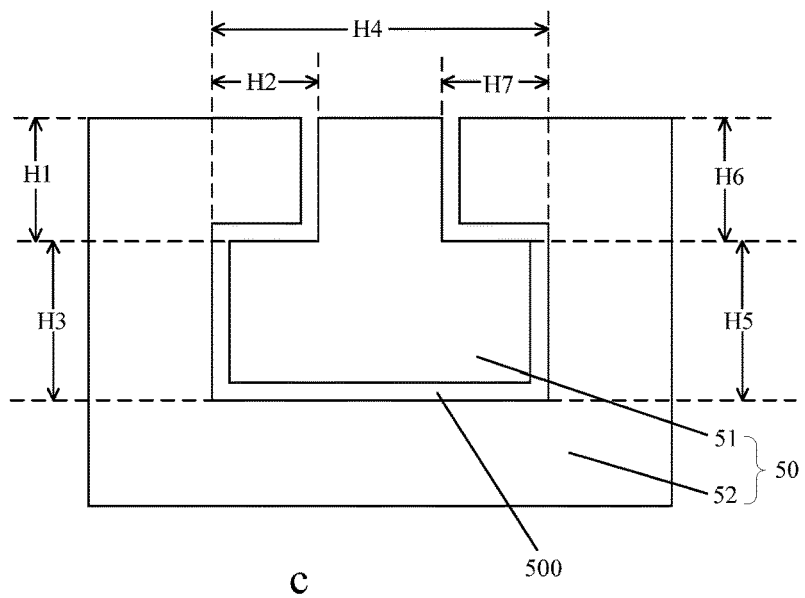

A slot is defined in the counterweight assembly 50, and the second end 42 of the stretch resistant layer 40 is fixed in the slot. The counterweight assembly 50 can include various structures. With reference to FIG. 5, FIG. 5 is a schematic cross-sectional view of the counterweight assembly 50, and the cross-section is perpendicular to a displaying surface of the flexible display screen 60.

With reference to a sub-figure a of FIG. 5, the counterweight assembly 50 is formed integrally and has a cross-section being an rectangle. A slot 500 is defined in a side of the rectangle and is located in a middle of the rectangle. The stretch resistant layer 40 is fixed in the slot 500, and is symmetrical along a front-rear direction to prevent an oblique issue A depth H of the slot 500 is less than or equal to the length L2 of the second region 420, which ensures that the flexible display screen 60 would not enter the counterweight assembly 50.

With reference to a sub-figure b of FIG. 5, the counterweight assembly 50 comprises a first counterweight assembly 51 and a second counterweight assembly 52. A protrusion is formed on the first counterweight assembly 51, and an indentation is defined in the second counterweight assembly 52 and corresponds to the protrusion. The first counterweight assembly 51 and the second counterweight assembly 52 are combined to form the slot 500, and the stretch resistant layer 40 is fixed in the slot 500. In the present structure, the depth H of the slot 500 is a sum of depths H1, H2, and H3, a length for which the stretch resistant layer 40 extends in the slot 500 can be H1, can be a sum of H1 and H2, can be a sum of H1, H2, and H3, or can be any value not greater than H. The depth H of the slot 500 is less than or equal to the length L2 of the second region 420, which ensures that the flexible display screen 60 would not enter the counterweight assembly 50.

With reference to a sub-figure c of FIG. 5, the counterweight assembly 50 comprises a first counterweight assembly 51 and a second counterweight assembly 52. A cross-section of the first counterweight assembly 51 is T-shaped, and a cross-section of the second counterweight assembly 52 is U-shaped. The first counterweight assembly 51 combines the second counterweight assembly 52 to form the slot 500. The stretch resistant layer 40 is fixed in the slot 500. The slot 500 formed by combination of the T-shape and U-shape, has better stability and reliability when clamping the stretch resistant layer 40 without causing any slip issue. In the present structure, a depth H of the slot 500 is a sum of H1, H2, H3, H4, H5, H6, and H7. A length for which the stretch resistant layer 40 extends in the slot 500 can be any value not greater than H. The depth H of the slot 500 is less than or equal to the length L2 of the second region 420, which ensures that the flexible display screen 60 would not enter the counterweight assembly 50.

In an embodiment, a speaker is further disposed on the counterweight assembly 50 and is configured to play music or other contents for interesting.

Figure 6:
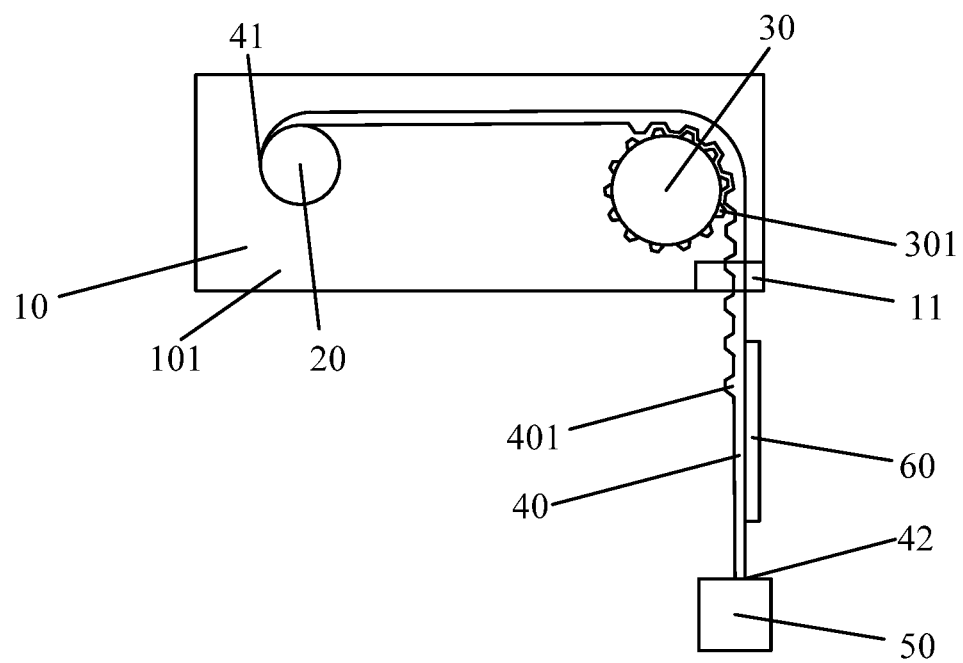
FIG. 6 is a schematic view of a second structure of a flexible display device provided by an embodiment of the present invention embodiment.

With reference to FIG. 6, FIG. 6 is a schematic view of a second structure of a flexible display device provided by an embodiment of the present invention embodiment. The flexible display device comprises a casing 10, a stretching member 20, a roller assembly 30, a stretch resistant layer 40, a counterweight assembly 50, and a flexible display screen 60.

In the present embodiment, the roller assembly 30 comprises a roller, and the roller is a gear. The gear is disposed between the stretching member 20 and the opening 11. Tooth structures 401 are formed on a surface of the stretch resistant layer 40 contacting with the gear, and the tooth structures 401 engage with the teeth 301 on the gear.

A shape of each of the teeth 301 of the first roller 31 can be a trapezoid, a triangle, etc. The tooth structures 401 of the stretch resistant layer 40 correspond to the teeth 301. By engagement thereof, automatic elevation of the stretch resistant layer 40 can be achieved.

Figure 7:
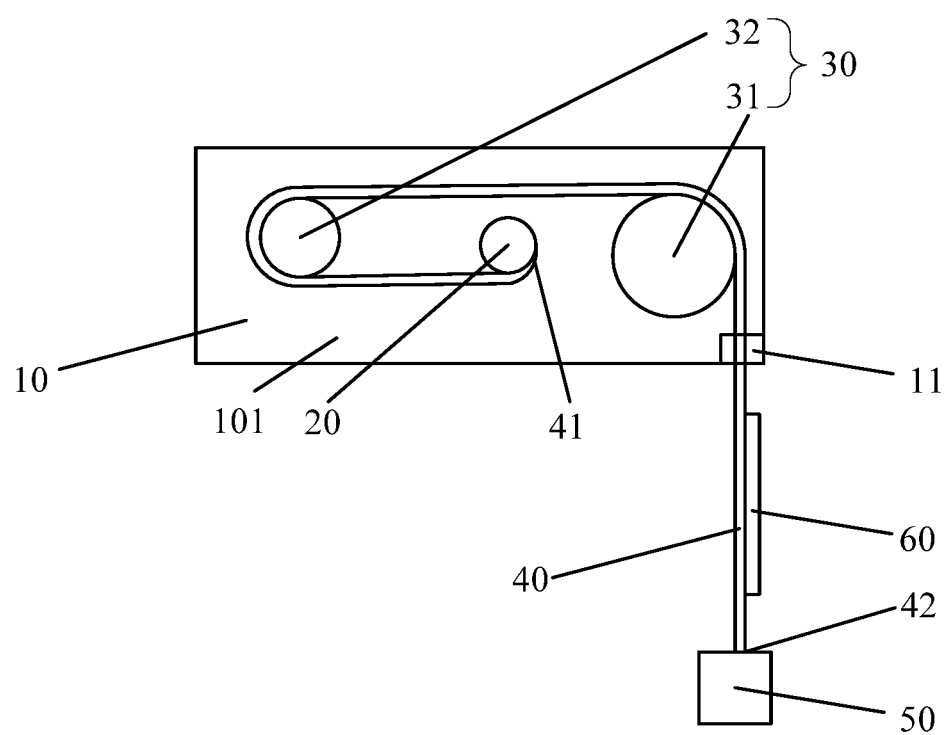
FIG. 7 is a schematic view of a third structure of a flexible display device provided by an embodiment of the present invention embodiment.

With reference to FIG. 7, FIG. 7 is a schematic view of a third structure of a flexible display device provided by an embodiment of the present invention embodiment. The flexible display device comprises a casing 10, a stretching member 20, a roller assembly 30, a stretch resistant layer 40, a counterweight assembly 50, a flexible a display screen 60.

In the present embodiment, the roller assembly 30 comprises a first roller 31 and a second roller 32. The first roller 31 and the second roller 32 are disposed on two sides of the stretching member 20. A distance between the first roller 31 and the opening 11 is less than a distance between the second roller 32 and the opening 11. An axial line of the first roller 31 parallels an axial line of the second roller 32.

The first end 41 of the stretch resistant layer 40 is fixed in the stretching member 20, and then the second end 42 of the stretch resistant layer 40 is wrapped around the second roller 32 first, is wrapped around the first roller 31, and finally extends out of the opening 11. The second end 42 is fixed in the counterweight assembly 50.

In an embodiment, the axial line of the first roller 31 and the the axial line of the second roller 32 are at a same level. A diameter of the first roller 31 is equal to or greater than a diameter of the second roller 32. Thus, the stretch resistant layer 40, when wrapped along a path from the second roller 32 to the first roller 31, would not contact with the stretching member to prevent damage of the stretch resistant layer 40.

In an embodiment, the axial line of the first roller 31 is higher than the axial line of the second roller 32. Diameters of the first roller 31 and the second roller 32 have no specific limitation as long as it is guaranteed that a highest point of the first roller 31 is higher than a highest point of the second roller 32. Thus, when wrapped from the second roller 32 to the first roller 31, the stretch resistant layer 40 does not contact with the stretching member, which prevents damage of the stretch resistant layer 40.

Figure 8:
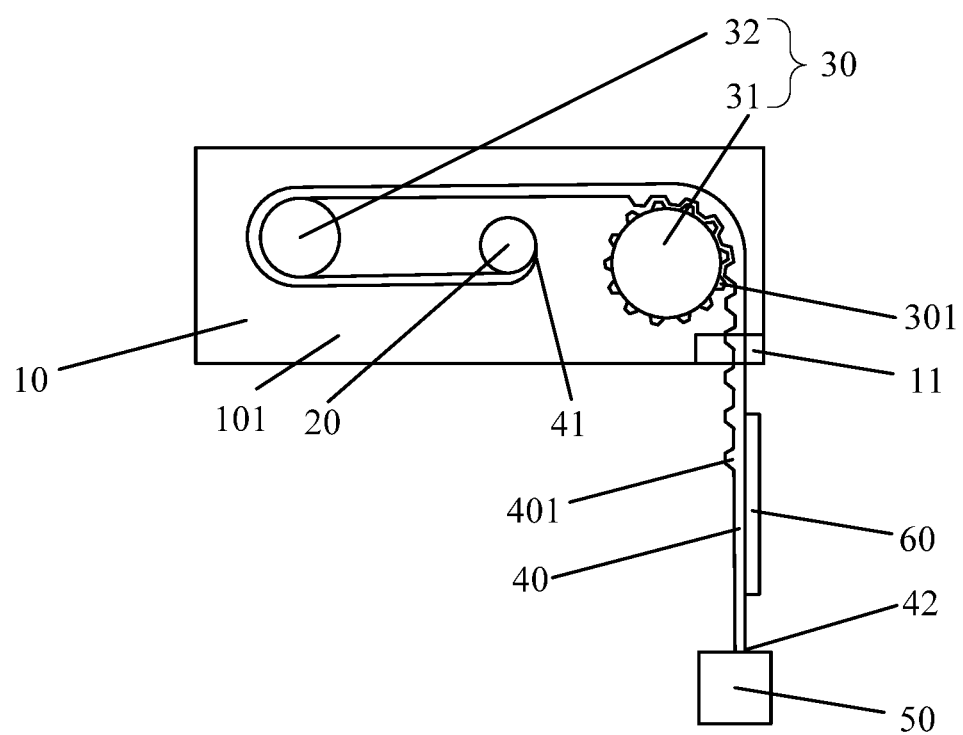
FIG. 8 is a schematic view of a fourth structure of a flexible display device provided by an embodiment of the present invention embodiment.

With reference to FIG. 8, FIG. 8 is a schematic view of a fourth structure of a flexible display device provided by an embodiment of the present invention embodiment. The flexible display device comprises a casing 10, a stretching member 20, a roller assembly 30, stretch resistant layer 40, a counterweight assembly 50, and a flexible display screen 60.

In the present embodiment, the roller assembly 30 comprises a first roller 31 and a second roller 32. The first roller 31 and the second roller 32 are disposed on two sides of the stretching member 20. A distance between the first roller 31 and the opening 11 is less than a distance between the second roller 32 and the opening 11. An axial line of the first roller 31 parallels an axial line of the second roller 32.

The first end 41 of the stretch resistant layer 40 is fixed in the stretching member 20, and then the second end 42 of the stretch resistant layer 40 is wrapped around the second roller 32 first, then is wrapped around the first roller 31, and finally extends out of the opening 11. The second end 42 is fixed in the counterweight assembly 50.

A difference of the structure from that in FIG. 7 is that the first roller 31 of the present embodiment is a gear, a tooth structures 401 is formed on a surface of the stretch resistant layer 40 contacting with the first roller 31, and the tooth structures 401 engages with teeth 301 on the gear.

A shape of each of the teeth 301 of the first roller 31 can be a trapezoid, a triangle, etc. The tooth structures 401 of the stretch resistant layer 40 correspond to the teeth 301. By engagement thereof, automatic elevation of the stretch resistant layer 40 can be achieved.

In an embodiment, the axial line of the first roller 31 and the axial line of the second roller 32 are at a same level. A diameter of the first roller 31 is equal to or greater than a diameter of the second roller 32. Thus, the stretch resistant layer 40, when wrapped along a path from the second roller 32 to the first roller 31, would not contact with the stretching member to prevent damage of the stretch resistant layer 40.

In an embodiment, the axial line of the first roller 31 is higher than the axial line of the second roller 32. Diameters of the first roller 31 and the second roller 32 have no specific limitation as long as it is guaranteed that a highest point of the first roller 31 is higher than a highest point of the second roller 32. Thus, when wrapped from the second roller 32 to the first roller 31, the stretch resistant layer 40 does not contact with the stretching member, which prevents damage of the stretch resistant layer 40.

Figure 9:
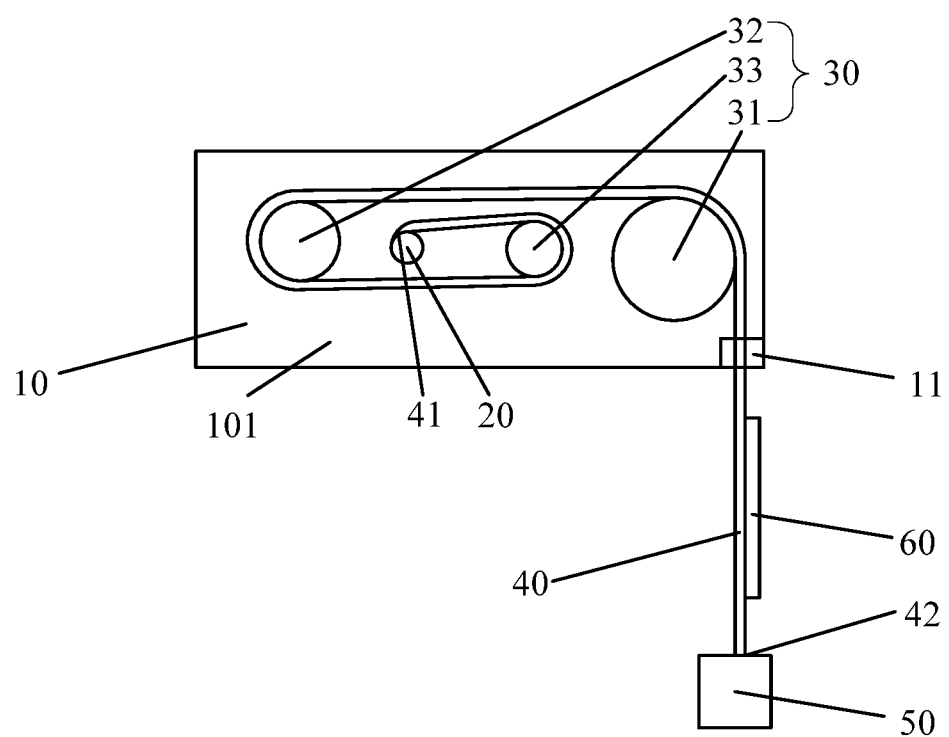
FIG. 9 is a schematic view of a fifth structure of a flexible display device provided by an embodiment of the present invention embodiment.

With reference to FIG. 9, FIG. 9 is a schematic view of a fifth structure of a flexible display device provided by an embodiment of the present invention embodiment. The flexible display device comprises a casing 10, a stretching member 20, a roller assembly 30, a stretch resistant layer 40, a counterweight assembly 50, and flexible display screen 60.

In the present embodiment, the roller assembly 30 comprises a first roller 31, a second roller 32 and a third roller 33. The first roller 31 and the second roller 32 are disposed on two sides of the stretching member 20 respectively. A distance between the first roller 31 and the opening 11 is less than a distance between the second roller 32 and the opening 11. The third roller 33 is disposed between the first roller 31 and the stretching member 41. Axial lines of the first roller 31, the second roller 32, and the third roller 33 parallel one another. The axial lines of the three can be located at a same level, or alternatively, the axial line of the third roller 33 is higher than the axial line of the second roller 32, and the axial line of second roller 32 is higher than the axial line of the first roller 31.

The first end 41 of the stretch resistant layer 40 is fixed in the stretching member 20, and the second end 42 of the stretch resistant layer 40 is wrapped around the third roller 33 first, then is wrapped around the second roller 32, then is wrapped around the first roller 31, and finally extends out of the opening 11. The second end 42 is fixed in the counterweight assembly 50.

In an embodiment, axial lines of the first roller 31, the second roller 32, and the third roller 33 are located at a same level. A diameter of the third roller 33 is equal to a diameter of the second roller 32. A diameter of the first roller 31 is greater than the diameter of the second roller 32. Thus, when wrapped from the second roller 32 to the first roller 31, the stretch resistant layer 40 do not contact with the stretching member and the third roller 33, which prevents damage of the stretch resistant layer 40.

In an embodiment, axial lines of the first roller 31, the second roller 32, and the third roller 33 are located at a same level. A diameter of the first roller 31 is equal to a diameter of the second roller 32. The diameter of the second roller 32 is greater than a diameter of the third roller 33. Thus, when wrapped from the second roller 32 to the first roller 31, the stretch resistant layer 40 does not contact the stretching member and the third roller 33, which prevents damage of the stretch resistant layer 40.

In an embodiment, first roller 31, axial lines of the second roller 32 and the third roller 33 are located at a same level. A diameter of the first roller 31 is greater than a diameter of the second roller 32. The diameter of the second roller 32 is greater than a diameter of the third roller 33. Thus, when wrapped from the second roller 32 to the first roller 31, the stretch resistant layer 40 does not contact the stretching member and the third roller 33, which prevents damage of the stretch resistant layer 40.

In an embodiment, axial lines of the second roller 32 and the third roller 33 are located at a same level. The level of the axial line of third roller 33 is lower that the level of the axial line of the second roller 32. Diameters of the first roller 31, the second roller 32, and the third roller 33 are equal. Thus, when wrapped from the third roller 33 to the first roller 31, the stretch resistant layer 40 do not contact with the stretching member, which prevents damage of the stretch resistant layer 40.

In an embodiment, axial lines of the second roller 32 and the third roller 33 are located at a same level. The level of the axial line of the third roller 33 is lower than the level of the axial line of the second roller 32. Diameters of the third roller 33 and the second roller 32 are equal. A diameter of the first roller 31 is not less than the diameter of the second roller 32. Thus, when wrapped from the third roller 33 to the first roller 31, the stretch resistant layer 40 does not contact with the stretching member, which prevents damage of the stretch resistant layer 40.

Figure 10:
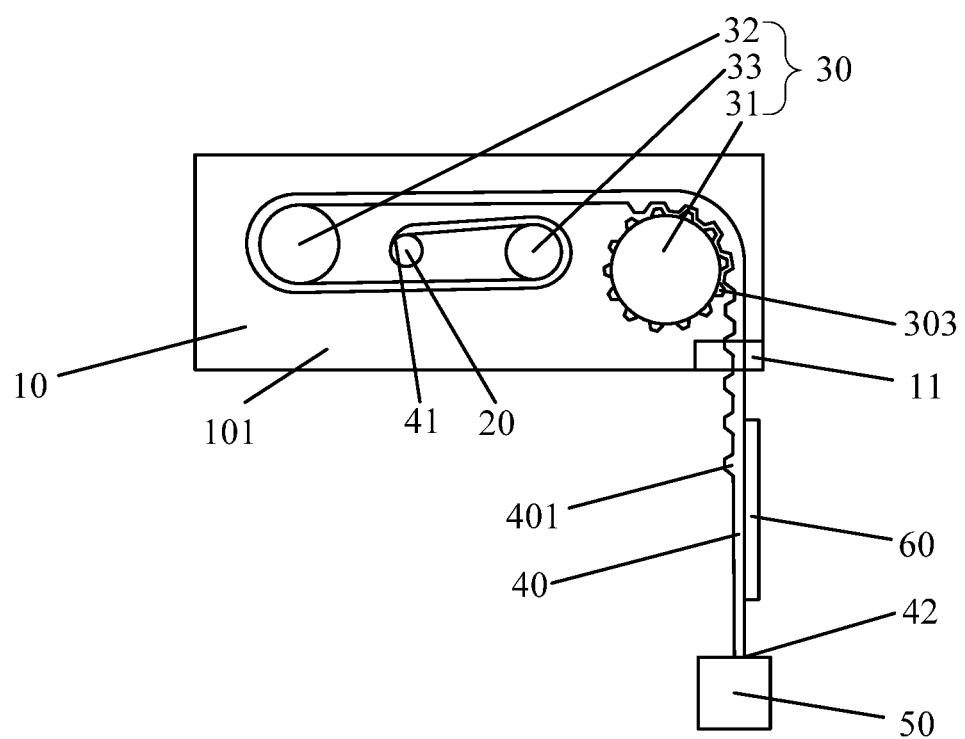
FIG. 10 is a schematic view of a sixth structure of a flexible display device provided by an embodiment of the present invention embodiment.

With reference to FIG. 10, FIG. 10 is a schematic view of a sixth structure of a flexible display device provided by an embodiment of the present invention embodiment. The flexible display device comprises a casing 10, a stretching member 20, a roller assembly 30, a stretch resistant layer 40, a counterweight assembly 50, and a flexible display screen 60.

In the present embodiment, the roller assembly 30 comprises a first roller 31, a second roller 32, and a third roller 33. The first roller 31 and the second roller 32 are disposed on two sides of the stretching member 20 respectively. A distance between the first roller 31 and the opening 11 is less than a distance between the second roller 32 and the opening 11. The third roller 33 is disposed between the first roller 31 and the stretching member 41. Axial lines of the first roller 31, the second roller 32, and the third roller 33 parallel one another. The axial lines of the tree can be located a same level, or alternatively, the axial line of the third roller 33 is higher than the axial line of the second roller 32, and the axial line of the second roller 32 is higher than the axial line of the first roller 31.

The first end 41 of the stretch resistant layer 40 is fixed in the stretching member 20, and the second end 42 of the stretch resistant layer 40 is wrapped around the third roller 33 first, then is wrapped around the second roller 32, then is wrapped around the first roller 31, and finally extends out of the opening 11. The second end 42 is fixed in the counterweight assembly 50.

A difference of the structure from that in FIG. 9 is that that the first roller 31 of the present embodiment is a gear, a tooth structures 401 is formed on a surface of the stretch resistant layer 40 contacting with the first roller 31, and the tooth structures 401 engages with teeth 301 on the gear.

A shape of each of the teeth 301 of the first roller 31 can be a trapezoid, a triangle, etc. The tooth structures 401 of the stretch resistant layer 40 correspond to the teeth 301. By engagement thereof, automatic elevation of the stretch resistant layer 40 can be achieved.

In an embodiment, axial lines of the first roller 31, the second roller 32, and the third roller 33 are located at a same level. A diameter of the third roller 33 is equal to a diameter of the second roller 32. A diameter of the first roller 31 is greater than the diameter of the second roller 32. Thus, when wrapped from the second roller 32 to the first roller 31, the stretch resistant layer 40 do not contact with the stretching member and the third roller 33, which prevents damage of the stretch resistant layer 40.

In an embodiment, axial lines of the first roller 31, the second roller 32, and the third roller 33 are located at a same level. A diameter of the first roller 31 is equal to a diameter of the second roller 32. The diameter of the second roller 32 is greater than a diameter of the third roller 33. Thus, when wrapped from the second roller 32 to the first roller 31, the stretch resistant layer 40 does not contact the stretching member and the third roller 33, which prevents damage of the stretch resistant layer 40.

In an embodiment, first roller 31, axial lines of the second roller 32 and the third roller 33 are located at a same level. A diameter of the first roller 31 is greater than a diameter of the second roller 32. The diameter of the second roller 32 is greater than a diameter of the third roller 33. Thus, when wrapped from the second roller 32 to the first roller 31, the stretch resistant layer 40 does not contact the stretching member and the third roller 33, which prevents damage of the stretch resistant layer 40.

In an embodiment, axial lines of the second roller 32 and the third roller 33 are located at a same level. The level of the axial line of third roller 33 is lower that the level of the axial line of the second roller 32. Diameters of the first roller 31, the second roller 32, and the third roller 33 are equal. Thus, when wrapped from the third roller 33 to the first roller 31, the stretch resistant layer 40 do not contact with the stretching member, which prevents damage of the stretch resistant layer 40.

In an embodiment, axial lines of the second roller 32 and the third roller 33 are located at a same level. The level of the axial line of the third roller 33 is lower than the level of the axial line of the second roller 32. Diameters of the third roller 33 and the second roller 32 are equal. A diameter of the first roller 31 is not less than the diameter of the second roller 32. Thus, when wrapped from the third roller 33 to the first roller 31, the stretch resistant layer 40 does not contact with the stretching member, which prevents damage of the stretch resistant layer 40.

It should be noted that in the roller assembly 30, the number of the roller is not limited, there can be more rollers. A number of the rollers can be designed according to a dimension of the accommodating chamber 101 in the casing 10. A number of the gears of the roller assembly 30 is also not limited. There can be a single gear, and can be a plurality of gears. The tooth structures 401 on the stretch resistant layer 40 can be disposed correspondingly according to the dimension and the number of the gears to achieve automatic elevation of the stretch resistant layer 40. A person of ordinary skill in the art can increase or reduce the number of the rollers in the roller assembly 30 a disposed region of the tooth structures 401 on the stretch resistant layer 40 based on actual demands.

According to the above embodiments:

The present invention provides a flexible display device, comprising a casing, a stretching member, a roller assembly, a stretch resistant layer, a disposing member, and a flexible display screen. An accommodating chamber is defined in the casing, and an opening is defined in a side edge of the accommodating chamber. The stretching member is disposed in the accommodating chamber. The roller assembly is disposed in the accommodating chamber and does not contact with the stretching member. The roller assembly comprises at least one roller. A first end of the stretch resistant layer is connected to the stretching member, and a second end of the stretch resistant layer is wrapped around the roller assembly and extends out of the casing through the opening. The counterweight assembly is connected to the second end of the stretch resistant layer. The flexible display screen is disposed on the stretch resistant layer. Because the flexible display screen is disposed on the stretch resistant layer. During the stretching member pulling the stretch resistant layer back into or extending the stretch resistant layer out of the casing, the flexible display screen almost suffers no force and the stress is exerted on the stretch resistant layer, which mitigates phenomenon of rupture of the forced flexible display screen and prolongs the lifespan of the flexible display screen. Furthermore, because of the disposing member, when extending out of the casing, the stretch resistant layer can pull the flexible display screen along a direction of the gravity, which enhances flatness of the flexible display screen.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A flexible display device, comprising:
a casing, an accommodating chamber defined in the casing, and an opening defined in a side edge of the accommodating chamber;
a stretching member disposed in the accommodating chamber;
a roller assembly disposed in the accommodating chamber and not contacting with the stretching member, wherein the roller assembly comprises at least one roller;
a stretch resistant layer, a first end of the stretch resistant layer connected to the stretching member, a second end of the stretch resistant layer wrapped around the roller assembly and extending out of the casing through the opening;
a counterweight assembly connected to the second end of the stretch resistant layer; and
a flexible display screen disposed on the stretch resistant layer;
wherein the flexible display device further comprises a driven member, the driven member drives the stretching member to pull the stretch resistant layer out of or retract the stretch resistant layer into the casing.

2. The flexible display device as claimed in claim 1, wherein the stretching member is a spiral spring.

3. The flexible display device as claimed in claim 1, wherein material of the stretch resistant layer is stainless steel.

4. The flexible display device as claimed in claim 1, wherein material of the stretch resistant layer is amorphous material.

5. The flexible display device as claimed in claim 1, wherein a thickness of the stretch resistant layer is 30 micrometers.

6. The flexible display device as claimed in claim 1, wherein the stretch resistant layer comprises a first region, a second region, and a middle region between the first region and the second region, the first end of the stretch resistant layer is located in the first region, the second end of the stretch resistant layer is located in the second region, the flexible display screen is located in the middle region, a maximum stretching amount of the stretching member is less than or equal to a length of the first region.

7. The flexible display device as claimed in claim 6, wherein the length of the first region is greater than or equal to a length of the middle region.

8. The flexible display device as claimed in claim 6, wherein the length of the first region is greater than a length of the second region.

9. The flexible display device as claimed in claim 1, wherein a slot is defined in the counterweight assembly, and the second end is fixed in the slot.

10. The flexible display device as claimed in claim 9, wherein a depth of the slot is less than or equal to a length of the second region.

11. The flexible display device as claimed in claim 1, wherein the counterweight assembly comprises a speaker.

12. The flexible display device as claimed in claim 1, wherein the display device further comprises an adhesive layer, the adhesive layer is disposed between the stretch resistant layer and the flexible display screen, and the flexible display screen is fixed on the stretch resistant layer by the adhesive layer.

13. The flexible display device as claimed in claim 12, wherein material of the adhesive layer is optical clear adhesive.

14. The flexible display device as claimed in claim 1, wherein the roller assembly comprises a roller, the roller is a gear, the gear is disposed between the stretching member and the opening, tooth structures are formed on a surface of the stretch resistant layer contacting with the gear, and the tooth structures engage with the gear.

15. The flexible display device as claimed in claim 1, wherein the roller assembly comprises a first roller and a second roller, the first roller and the second roller are disposed on two sides of the stretching member respectively, wherein a distance between the first roller and the opening is less than a distance between the second roller and the opening, an axial line of the first roller parallels an axial line of the second roller, the first end of the stretch resistant layer is connected to the stretching member, the second end of the stretch resistant layer is sequentially wrapped around the second roller and the first roller and extends out of the casing through the opening.

16. The flexible display device as claimed in claim 15, wherein a diameter of the first roller is greater than or equal to a diameter of the second roller.

17. The flexible display device as claimed in claim 15, wherein the first roller is a gear, tooth structures are formed on a surface of the stretch resistant layer contacting with the first roller, and the tooth structures engage with the gear.

18. The flexible display device as claimed in claim 15, wherein the roller assembly further comprises a third roller, the third roller is disposed between the first roller and the stretching member, an axial line of the third roller parallels the axial line of the first roller, the first end of the stretch resistant layer is connected to the stretching member, the second end of the stretch resistant layer is sequentially wrapped around the third roller, the second roller, and the first roller and extends out of the casing from the opening.

19. The flexible display device as claimed in claim 18, wherein the first roller is a gear, tooth structures are formed on a surface of the stretch resistant layer contacting with the first roller, and the tooth structures engage with the gear.

* * * * *